G. FRANK, DEC'D.
M. J. FRANK, EXECUTRIX.
LATCH.
APPLICATION FILED JULY 19, 1920.
1,395,568.
Patented Nov. 1, 1921.
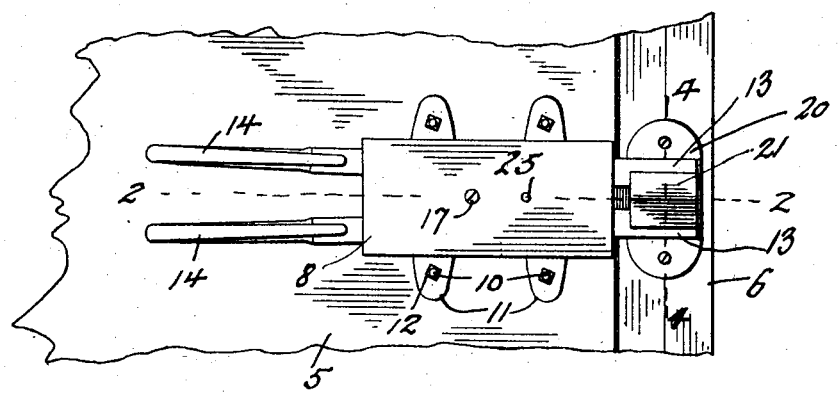
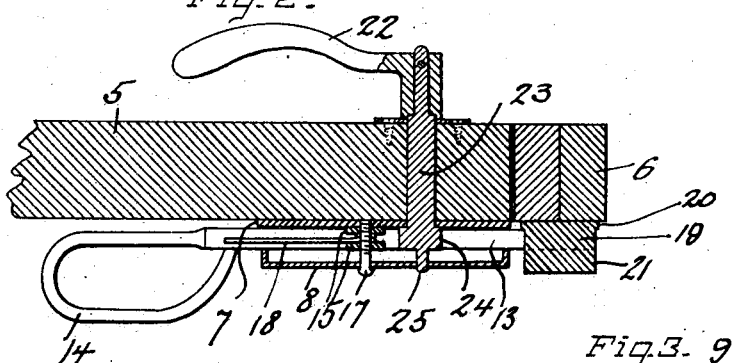
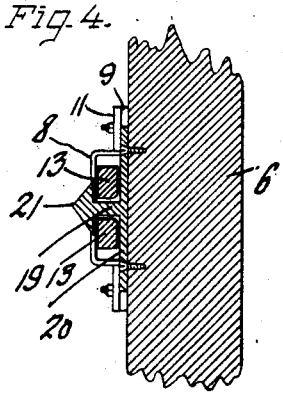
Inventor
George Frank

UNITED STATES PATENT OFFICE.

GEORGE FRANK, DECEASED, LATE OF TITONKA, IOWA, BY MARY J. FRANK, EXECUTRIX, OF TITONKA, IOWA.

LATCH.

1,395,568.   Specification of Letters Patent.   Patented Nov. 1, 1921.

Application filed July 19, 1920. Serial No. 397,297.

*To all whom it may concern:*

Be it known that GEORGE FRANK, deceased, late a citizen of the United States, formerly residing at Titonka, in the county of Kossuth and State of Iowa, had invented new and useful Improvements in Latches, of which the following is a specification.

This invention relates to latches for doors, gates and other swinging closures, and its object is to provide a simple and efficient latch which can be operated from either side of the closure to which it is applied.

The object stated is attained by means of a novel combination and arrangement of parts to be hereinafter described and claimed, and in order that the same may be better undertsood, reference is had to the accompanying drawing forming a part of this specification.

In the drawing,

Figure 1 is an elevation of the latch;

Fig. 2 is a horizontal section on the line 2—2 of Fig. 1;

Fig. 3 is a face view of a fragment of the latch, with the top of the housing removed, and Fig. 4 is a vertical section on the line 4—4 of Fig. 1.

Referring specifically to the drawing, 5 denotes a fragment of a door, gate or similar swinging closure, and 6 the frame or casing to which the latter is fitted. On one side of the closure is mounted a housing consisting of a base plate 7 and a top plate 8 spaced therefrom. The base plate has lugs 9 by which it is bolted to the closure, and the bolts 10 also pass through lugs 11 on top and bottom flanges of the plate 8 spacing the latter from the base plate. The bolts take nuts 12, whereby the housing is securely fastened in place on the closure 5, and the two members of the housing are held in assembled relation.

The housing hereinbefore described incloses two spring bolts 13 projecting at one end from the front end of the housing and at their other ends from the rear end of the housing, said rear ends being loop shaped to form handles 14, said looped ends being vertically spaced.

The two bolts 13 are provided intermediate their ends at their inner edges with outstanding ears 15 which overlap and have alined perforations to receive a pivot screw 17 passing through the top plate 8 and screwed into the base plate 7. To the bolt 17 is anchored by being coiled around the same, a spring having its two ends 18 extending rearward to press against the inner edges of the bolts 13, thereby spreading said ends and bringing their opposite or forward ends together.

On the frame 6 is a keeper for the projecting forward ends of the latch bolts 13, the same comprising a shank 19 projecting outward from a base plate 20 secured to the frame 6, and having a triangular or wedge-shaped head 21 standing out above and below the shank. The apex of the head coincides with the space between the bolts 13, and hence when the closure 5 is swung to carry the bolts against the head, the opposite inclines thereof spread the bolts, and they then snap behind the head as shown in Fig. 4. The bottom inner corners of the bolts are slightly rounded off as shown in Fig. 4 so that the point of the head can readily enter therebetween to wedge them apart. The spring 18 is tensioned when the bolts are spread to engage the keeper, and hence when they snap behind the head of the keeper they are firmly held.

To disengage the bolts 13 from the keeper, it is necessary only to grasp the handles 14 and bring the same together, which spreads the bolts so that they may clear the head 21 when the closure 5 is swung open. In order that the bolts may be operated from the opposite side of the closure also, there is located on that side a crank handle 22 fastened to a spindle 23 passing through an aperture in the closure and into the latch housing and having in the latter a cross head 24 which is located between the bolts 13. This cross head may be rotated by operating the handle 22 to pry the bolts apart or spread the same. It will therefore be seen that the bolts are operated on one side of the door by the handle loops 14, and on the other side by the crank handle 22. The top plate 8 has an aperture in which the reduced end 25 of the spindle 23 is journaled.

The structure hereinbefore described provides a simple, strong and efficient latch and one that can readily be applied to bar doors, wagon-end gates and other swinging closures.

I claim:

A latch comprising a housing, a pair of pivotally connected latch bars in the housing and projecting from the ends thereof, one of the projecting ends having handle portions, and the other projecting ends being adapted to engage a keeper, a rotatable cross head between the bolts for spreading the same, a spindle carrying the cross head and projecting rearward from the housing, and an operating handle on the outer end of the spindle, the aforesaid handle portions of the bolts and the operating handle of the spindle being on opposite sides of the closure to which the latch is applied.

In testimony whereof I affix my signature.

MARY J. FRANK,
*Executrix of George Frank, deceased.*